United States Patent
Collard et al.

[11] Patent Number: 5,504,141
[45] Date of Patent: Apr. 2, 1996

[54] POLYPHENYLENE SULPHIDE-BASED COMPOSITIONS WITH IMPROVED IMPACT STRENGTH AND PROCESS FOR PREPARING THEM

[75] Inventors: Marie-Paule Collard, Vilvoorde; Danny Van Hoyweghen, Heverlee, both of Belgium; Morand Lambla, Hoenheim; Raphael Mestanza, Schiltigheim, both of France

[73] Assignee: Solvay (Société Anonyme), Brussels, Belgium

[21] Appl. No.: 321,072

[22] Filed: Oct. 11, 1994

[30] Foreign Application Priority Data

Oct. 21, 1993 [BE] Belgium ................. 09301123

[51] Int. Cl.⁶ .................................................. C08L 51/00
[52] U.S. Cl. ................ 524/539; 524/609; 525/189; 525/327.3; 525/375; 525/379
[58] Field of Search ............ 525/189, 327.3, 525/375, 379; 524/539, 609

[56] References Cited

U.S. PATENT DOCUMENTS

| | | | |
|---|---|---|---|
| 3,954,898 | 5/1976 | Hirota et al. | 525/327.3 |
| 4,835,200 | 5/1989 | St. Clair | 524/100 |
| 4,889,893 | 12/1989 | Kobayashi et al. | 525/189 |
| 5,149,731 | 9/1992 | Uota et al. | 525/189 |

FOREIGN PATENT DOCUMENTS

| | | |
|---|---|---|
| 186326 | 7/1986 | European Pat. Off. . |
| 472898 | 3/1992 | European Pat. Off. . |
| 484273 | 5/1992 | European Pat. Off. . |
| 502358 | 9/1992 | European Pat. Off. . |
| 546608 | 6/1993 | European Pat. Off. . |
| 560046 | 9/1993 | European Pat. Off. . |
| 62-153345 | 7/1987 | Japan ................ 525/189 |

*Primary Examiner*—Mark Sweet
*Attorney, Agent, or Firm*—Spencer & Frank

[57] ABSTRACT

Polyphenylene sulphide-based compositions with high impact strength essentially comprising, by weight, 60 to 99.5 parts of polyphenylene sulphide and 0.5 to 40 parts of a combination C comprising at least one compound Cl chosen form olefinic elastomers comprising epoxy groups and at least one tertiary amine C2. During the preparation of these compositions, the tertiary amine C2 is preferably incorporated in last place with respect to the other constituents.

14 Claims, No Drawings

POLYPHENYLENE SULPHIDE-BASED COMPOSITIONS WITH IMPROVED IMPACT STRENGTH AND PROCESS FOR PREPARING THEM

FIELD OF THE INVENTION

The present invention relates to polyphenylene sulphide-based compositions with improved impact strength. It relates more precisely to compositions comprising polyphenylene sulphide and an olefinic elastomer comprising at least one epoxide group. It also relates to a process for preparing these compositions.

TECHNOLOGY REVIEW

Poly(phenylene sulphide) (referred to briefly as PPS hereinafter) exhibits an outstanding thermal stability and a very good chemical resistance, which make it a material of choice for the moulding of components which can be employed especially in electrical and electronic applications and in the motor vehicle industry. However, it has the disadvantage of having a low impact strength.

This disadvantage has already been partially overcome by various solutions, several of which are mentioned in Patent Application EP 546,608 (Solvay).

In this document, it is stated especially that the impact strength of the compositions containing PPS can be improved by incorporating therein a combination of an olefinic elastomer comprising epoxide groups, on the one hand, and of a crosslinking agent containing functional groups which are reactive with respect to these epoxide groups, on the other hand.

This solution leads to advantageous results but there exists particularly severe applications where a very high impact strength is required of PPS compositions. The amount of additives added to the PPS, and in particular the amount of crosslinking agent, cannot, however, be increased indefinitely, which could lead to deterioration of the mechanical and/or thermal properties. Other techniques for improving the impact strength must therefore be found in which recourse is made to amounts of additives which are as limited as possible.

SUMMARY OF THE INVENTION

It has now been found that the impact strength of compositions containing PPS can be greatly improved if use is made, in addition to an olefinic elastomer comprising at least one epoxide group, of a compound capable of inducing crosslinking of the latter, which compound is present in very small amounts.

DETAILED DESCRIPTION OF THE INVENTION

More precisely, the present invention relates to polyphenylene sulphide-based compositions comprising, by weight, 60 to 99.5 parts of polyphenylene sulphide and 0.5 to 40 parts of a combination C comprising at least one compound C1 chosen from olefinic elastomers comprising at least one epoxide group, which are characterized in that the combination C additionally comprises at least one tertiary amine C2 which is liquid at the temperature of use of the said compositions (at atmospheric pressure).

The PPS contained in the compositions according to the invention can be a homopolymer or a copolymer comprising at least 70 mol %, preferably at least 90 mol %, of p-phenylene sulphide repeat units. PPSs containing at least 70 mol % of p-phenylene sulphide repeat units impart sufficient thermal stability and chemical resistance to the compositions according to the invention. Less than 30 mol % of the repeat units present in the PPS may optionally be chosen from those which have the following structures:

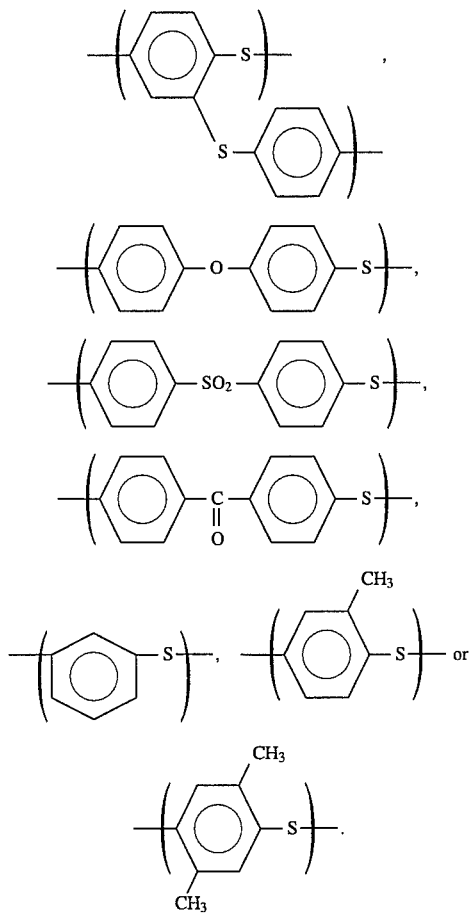

A mixture of a number of polymers having this structure may also be used.

Known processes for the manufacture of PPSs (several of which are mentioned in the abovementioned Patent EP 546,608) may be used. One of these processes involves heating an alkali metal sulphide, in most cases sodium sulphide hydrate, in a polar solvent in order to remove the water of hydration therefrom, followed by the addition of a dihalogenated aromatic compound, in particular p-dichlorobenzene, and polymerization at higher temperature (cf., for example, U.S. Pat. No. 3,354,129). The molecular weight of the PPS thus obtained can be increased in a known manner by oxidative aftertreatment, resulting in branched products, or by addition to the polymerization mixture of known agents for increasing the molecular weight (water, esters, anhydrides and alkali metal carboxylates and sulphonates, etc.), resulting in linear products of high molecular weight.

The PPS which can be employed according to the invention may contain one or a number of conventional additives in quantities which are not detrimental to the properties of the compositions according to the invention. By way of non-limiting examples of such additives, there may be mentioned antioxidants, heat stabilizers, anti-UV agents, flame-retardant agents, antistatic agents, lubricants, corrosion inhibitors, pigments, processing aids, agents for controlling the degree of crosslinking, crosslinking accelerators, and the like.

Small quantities of one or a number of other polymers may also be added to the PPS, provided that their presence is not detrimental to the properties of the compositions envisaged.

The PPS which can be employed according to the invention may also be treated, to improve its affinity for the compound C1, with an acid, with hot water and/or with an organic solvent.

The compound C1 employed in the compositions according to the invention is an olefinic elastomer comprising at least one epoxide group. This is intended to denote an elastomeric copolymer derived from at least one olefin and from at least one vinylic comonomer (M1) carrying at least one epoxide functional group and comprising at least one ethylenically unsaturated radical. A single or a number of different compounds C1 corresponding to this definition may be employed.

The olefins from which these copolymers are derived may be $\alpha$-monoolefins or diolefins containing conjugated double bonds.

Specific examples of $\alpha$-monoolefins are ethylene, propylene, 1-butene, isobutylene and the like. Ethylene is preferred as $\alpha$-monoolefin.

Specific examples of diolefins containing conjugated double bonds are 1,3-butadiene, 2-methyl-1,3-butadiene, 2,3-dimethyl-1,3-butadiene, chloroprene, 1,3-pentadiene, 1,3-hexadiene and the like. 1,3-Butadiene is preferred as diolefin containing conjugated double bonds.

The use of a number of different olefins to prepare the compound C1 also comes within the scope of the invention.

The comonomer M1 from which the elastomeric copolymers which can be employed as compounds C1 are derived is advantageously a glycidyl ester of $\alpha$, $\beta$-unsaturated carboxylic acid. Specific examples of glycidyl esters of $\alpha,\beta$-unsaturated carboxylic acids are glycidyl acrylate, glycidyl methacrylate, glycidyl $\alpha$-ethylacrylate, glycidyl itaconate and the like.

The comonomer M1 may also be chosen from glycidyl ethers containing an ethylenic unsaturation, such as allyl glycidyl ether, 2-methylallyl glycidyl ether and styryl p-glycidyl ether, for example, or from other monomers containing an epoxide group and an ethylenically unsaturated radical, such as, for example, 3,4-epoxybutene, 3,4-epoxy-3-methyl-1-butene, 3,4-epoxy-1-pentene, 3,4-epoxy-3-methyl-1-pentene and 5,6-epoxy-1-hexene.

Glycidyl esters of $\alpha,\beta$-unsaturated carboxylic acids are preferred as comonomer(s) M1, especially glycidyl acrylate and methacrylate, and, of them, very particularly the latter.

Apart from at least one olefin and at least one comonomer M1, the compound C1 may advantageously additionally be derived from at least one other unsaturated comonomer (M2) which is copolymerizable with olefins. This comonomer M2 is generally chosen from:

alkyl esters of $\alpha,\beta$-unsaturated carboxylic acids, such as, for example, methyl acrylate and methacrylate, ethyl acrylate and methacrylate, n-propyl acrylate and methacrylate, isopropyl acrylate and methacrylate or n-butyl, isobutyl and t-butyl acrylate and methacrylate;

vinyl esters of carboxylic acids, such as, for example, vinyl acetate, vinyl propionate and vinyl benzoate;

styrene;

acrylonitrile, and the like.

Advantageously, the unsaturated comonomer M2 is an alkyl ester of $\alpha,\beta$-unsaturated carboxylic acid, preferably an alkyl acrylate containing from 1 to 4 carbons, and in a particularly preferred manner ethyl acrylate.

The compound C1 can be obtained in a known manner by copolymerization of the corresponding monomers, for example by high-pressure radical copolymerization of the corresponding monomers.

The quantity of olefin present in the compound C1 is generally at least 50%, preferably at least 55%. It is generally at most 90%, preferably at most 85% (the quantity of olefin is expressed each time by weight of the compound C1).

The quantity of comonomer M1 present in the compounds C1 is generally at least 0.1%, preferably at least 0.5%. It is generally at most 40%, preferably at most 30% (the quantity of comonomer is expressed each time by weight of the compound C1). When the compound C1 also contains a comonomer M2, the latter generally represents at least 0.5%, preferably at least 5% and generally at most 50%, preferably at most 45% (by weight of the compound C1).

Quantities of monomer M1 (and M2) which are too small do not allow the desired effects to be obtained, and quantities of monomer M1 (and M2) which are too high result in crosslinking of the elastomer phase.

Compounds C1 which are particularly preferred contain, by weight, from 60 to 80% of ethylene as $\alpha$-monoolefin, from 1 to 15% of glycidyl acrylate or methacrylate as comonomer M1 and from 15 to 40% of $C_{1-4}$ alkyl acrylate as comonomer M2.

Tertiary amine is intended to denote, in accordance with common sense, compounds containing at least one nitrogen atom which is not directly bonded to any hydrogen atom.

The Applicant thinks, without nevertheless this interpretation limiting the scope of the present invention, that it is probable that the tertiary amine C2 acts as a crosslinking catalyst. Crosslinking catalyst is intended to denote (in accordance with the current acceptance of the term "catalyst") a compound which makes it possible to initiate the reaction in which it participates. In the present case, the term "crosslinking catalyst" is used in a sense different from that of "crosslinking agent", which generally denotes polymer or non-polymer polyfunctional compounds comprising functional groups of the amino, hydroxyl, carboxyl and carboxylic acid anhydride type, part of which forms, after crosslinking, bonds connecting together a number of the polymer chains constituting the composition. During the crosslinking, these crosslinking agents must, for this reason, be used in relatively large quantities, generally of the order of 10% (by weight) with respect to the quantity of compound(s) C1.

One of the consequences of the use of a crosslinking catalyst is that a very small quantity is sufficient to obtain the desired degree of crosslinking. Thus, in the context of the present invention, the total quantity of tertiary amine C2 is preferably (expressed by weight with respect to the total weight of the compound C1 present in the compositions) at most 10%, more preferentially at most 5%. In order that the crosslinking time remains reasonable, quantities of at least 0.01%, preferably of at least 0.1%, thereof are generally used. The abovementioned quantities relate to the total quantity of tertiary amines C2, if a number from among them are used.

There are no restrictions on the tertiary amines C2, provided that they are liquid (at atmospheric pressure) at the temperature of use of the compositions envisaged, which is generally of the order of approximately 280° to 350° C. (material temperature). This implies especially that their boiling, decomposition and possibly sublimation temperatures (at atmospheric pressure) must be greater than this temperature of use. The boiling, decomposition and possibly sublimation temperatures (at atmospheric pressure) are generally greater than 350° C. and preferably greater than 370° C. Likewise, the melting temperature (at atmospheric pressure) of these tertiary amines must be less than the temperature of use of the compositions envisaged; their melting temperature is generally less than 250° C. preferably less than 200° C.

As an example of a tertiary amine which does not correspond to these conditions, there may be mentioned N-aminoethylpiperazine, whose boiling temperature at atmospheric pressure is approximately 220° C.

The tertiary amine C2 may be a cyclic or noncyclic, aromatic or aliphatic tertiary amine in which the three side groups may be identical or different. As an example of an aromatic tertiary amine containing three identical side groups, there may be mentioned triphenylamine. As examples of cyclic tertiary amines, there may be mentioned 1,2-4H-diazepine, indolenine and 1,5-pyrindine, and their derivatives. As stated above, only those of these compounds which are liquid (at atmospheric pressure) at the temperature of use of the targeted compositions can be employed in the context of the present invention.

In a preferred manner, the tertiary amine C2 contains at least one $CH_2$ group bonded directly to one of its nitrogen atoms performing the tertiary amine function. In a particularly preferred manner, the tertiary amine contains at least two, and ideally three, $CH_2$ groups bonded directly to a nitrogen atom performing the tertiary amine function. If a compound contains a number of nitrogen atoms performing the tertiary amine function, both one or a number of these nitrogen atoms can carry one or a number of $CH_2$ groups.

As examples of aliphatic tertiary amines containing three $CH_2$ groups bonded directly to a nitrogen atom performing the tertiary amine function (in this case the sole nitrogen atom which they carry), there may be mentioned trialkylamines. As stated above, only those of these compounds which are liquid (at atmospheric pressure) at the temperature of use of the targeted PPS compositions can be employed in the context of the present invention.

According to an advantageous variant of the present invention, the tertiary amine C2 contains at least one aromatic group separated from one of its nitrogen atoms performing the tertiary amine function by at least one $CH_2$ group. It preferably contains two, and in a particularly preferred manner three, aromatic groups corresponding to this definition.

Examples of such compounds are benzyldiethylamine, dibenzylethylamine and tribenzylamine, and their derivatives (under the conditions mentioned above). Tribenzylamine (subsequently known as "TBA") gives extremely advantageous results.

According to another advantageous variant of the present invention, the tertiary amine C2 is an azine. "Azines" is intended to denote optionally substituted, 6-membered heterocyclic organic compounds comprising at least one nitrogen atom, such as pyridine, diazines and triazines. As indicated above, only those of these compounds which are liquid at the temperature of use of the compositions can be employed in the context of the present invention.

This "substitution" can especially indicate the presence of at least one atom bonded to at least one of the 6 atoms constituting the heterocyclic ring of the azine: as examples of such substituted azines, there may be mentioned 4-phenylpyridine (under the conditions mentioned above). These substituents may optionally be bonded so as to form, with the azine, a polycyclic compound: as examples of such compounds, there may be mentioned cinnoline and quinazoline, and their derivatives (under the abovementioned conditions).

This substitution may also indicate the replacement of at least one of the 6 carbon atoms of the heterocyclic ring of the azine by another atom, for example oxygen or sulphur: 1,2-4H-oxazine and 1,2,5-oxathiazine correspond, for example, to this definition. These two types of substitution may optionally be combined, as is, for example, the case with 1,3-2H-benzoxazine and its derivatives (under the conditions mentioned above).

Whatever the substitution type(s), it is, however, necessary that at least one of the nitrogen atoms forming part of the heterocyclic ring of the azine is not substituted by hydrogen and performs the tertiary amine function in accordance with the invention: the use of piperazine or of orthoisoxazine is, for example, excluded.

The azine preferably carries at least one aromatic group. This thus applies, for example, to 2,4-bis(n-octylthio)-6-(4'-hydroxy-3', 5' -di-tert-butylanilino)-1,3,5-triazine (marketed especially by Ciba-Geigy under the tradename Irganox® 565), the use of which is advantageous.

Apart from the PPS and the combination C, the compositions according to the invention may also contain one or a number of other conventional additives in quantities which are not detrimental to the properties of these compositions. Thus, in general, these compositions may contain from 5 to 300%, preferably from 10 to 200%, (with respect to the weight of PPS) of one or a number of fillers such as talc, calcium carbonate, mica, magnesium oxide, metal powders, ballotini, carbon black and the like, optionally surface-treated with coupling agents such as silanes or titanates.

The invention is additionally particularly advantageous in the case of PPS compositions as described above additionally comprising reinforcing fibres, for example glass, carbon and/or potassium titanate fibres, the use of which is very common in technical applications and makes it possible to improve certain mechanical properties. Glass fibres are preferred.

Whereas, as stated above, the incorporation in the PPS alone of a compound C1 and of an optional crosslinking agent results in a certain increase in the impact strength of the compositions, it was observed that the additional incorporation in such compositions of reinforcing fibres can result in a reduction in their impact strength.

The addition of at least one tertiary amine C2 in accordance with the present invention makes it possible, in contrast, to obtain PPS compositions (comprising at least one compound C1), reinforced by reinforcing fibres, whose impact strength is comparable with that of the fibre-free PPS compositions, as described above.

The preparation of the compositions according to the invention can be carried out by any known process for the preparation of thermoplastic compositions. Their process of preparation optionally contains a dry mixing stage of some of the ingredients of the compositions (at room temperature, in the powder form), followed by a melt-blending stage, that is to say at high temperature, during which their other ingredients are simultaneously or successively added.

The preparation of the compositions according to the invention may also be carried out solely by melt-blending, with simultaneous or successive introduction of the various ingredients.

The blending may be performed in any device whatever which is capable of bringing the PPS into the molten state and subjecting it to intensive kneading in the state. In general, this kneading may be performed equally well in noncontinuous or continuous mixers of the external type or of the internal type such as those marketed by the companies Troester, Banbury and others. For technical and economic reasons, it is preferred to work in mixers of the internal type, in particular in extruders (containing one or a number of screws), which constitute a particular class of internal mixers. It is preferred to work in extruders containing two screws rotating in the same direction (corotative twin screw).

For the practical implementation of the variants of the process of preparation according to the invention which are performed in extruders and in which all the ingredients are not introduced simultaneously, these extruders are fitted with one or a number of secondary feeds distributed along their body.

The kneading temperature of the targeted compositions is generally from approximately 280° to 350° C., preferably from 290° to 330° C. Temperatures which are too low do not permit a sufficient melting of the PPS to be carried out for a homogeneous dispersion of the combination C therein and temperatures which are too high can result in degradation of some of the constituents used.

Where it concerns PPS compositions which are or are not reinforced with glass fibres, their impact strength advantageously benefits from the use of a particular process for the incorporation of the compounds C1 and C2 described above.

To this end, another subject of the present invention, closely related to the above, relates to a process for the preparation of compositions with high impact strength, as described above, in which the tertiary amine C2 is incorporated as soon as possible at the same time as the last introduced of the other constituents, and preferably after the latter.

In particular, preferred processes of preparation corresponding to this definition are the two following:

(a) the following are introduced into an extruder, by means of separate hoppers, in this order:
the PPS and the compound C1 (simultaneously),
then optional glass fibres,
then the crosslinking catalyst C2.

(b) the following are introduced into an extruder, by means of separate hoppers, in this order:
the PPS,
then the compound C1 and optional glass fibres,
then the crosslinking catalyst C2.

The optional conventional additives are preferably introduced before the compound C2, for example at the same time as the PPS or as the optional glass fibres.

By way of example, in the preferred mixing devices for the implementation of the invention (co-rotative twin-screw extruders operating at approximately 300° C. at a speed of rotation of between 100 and 300 revolutions per minute), the main feed (introduction of the PPS and of the compound C1) and the secondary feed (introduction of the compound C2) are arranged at a distance such that the time taken by the molten mix to travel from the first to the second is from 10 seconds to 5 minutes, preferably from 15 seconds to 3 minutes.

The process according to the invention makes it possible to obtain a good dispersion of an elastomeric phase in a PPS matrix, with good interfacial cohesion. The compositions in accordance with the invention exhibit a greatly increased flexibility whew compared with PPS alone.

The compositions in accordance with the invention can be converted by any known moulding method into injection-moulded or extruded articles, or alternatively into semifinished products such as granules. They may be intended for any application for which PPS is employed, for example for the injection moulding of technical components with, in this case, improved impact strength properties and better acoustic characteristics (noise and vibration attenuation), or alternatively for the extrusion of pipes, filaments, films and the like.

The very small quantity of compound C2 additionally makes it possible to obtain articles whose mechanical properties (impact strength) are advantageous and are retained in a satisfactory manner with time, even at high temperatures.

EXAMPLES

The following examples illustrate the invention in a non-limiting manner. Examples 1R, 2R, 4R and 5R are given by way of comparison.

In these different examples, partially cross-linked PPS, marketed by Tohpren under the name T4, was extruded by means of a single-screw extruder (of ZSK 25 type, from the company Werner & Pfleiderer) rotating at 300 r/min. This extruder contains three feed zones: the main hopper (MH) and two force-feeders (ZSB1 and ZSB2) are encountered successively in the direction of movement of the material. On each occasion, the PPS was introduced via the main hopper.

Use was made, as compound C1, of the resin Lotadere AX 8660 (produced by Atochem) (ethylene/ethyl acrylate/glycidyl methacrylate terpolymer). The quantities of the compound C1 are expressed by weight with respect to the virgin PPS.

Use was made, as tertiary amine C2, of tribenzylamine (TBA), the quantity of which is expressed by weight with respect to the total of the polymer materials present (PPS +C1).

The temperature of the material at the extruder outlet was 300°±5° C. each time and its flow rate 15 kg/h.

In Examples 4R to 7, use was additionally made of glass fibres ("GF") of the OCF P 327 type (produced by Vetrotex) in quantities of 40% by weight with respect to the total weight of the compositions (that is to say including the glass fibres).

On each occasion, the impact strength of the tested compositions was measured by two methods providing a break energy:

the instrument-controlled falling weight method (IFW), according to ASTM standard D 3763, applied to square, injection-moulded samples with a thickness of 2 mm, and the Izod test carried out on notched test pieces according to ASTM standard D 256-90b.

The following Table I summarizes the operating conditions and the results of the measurements.

Comparative Examples 1R (PPS alone) and 2R (PPS+C1)

As anticipated, an improvement in the impact strength of the composition PPS/C1 is observed in Example 2R with respect to that of PPS alone (1R), by virtue of the incorporation therein of a relatively high quantity of compound C1.

Example 3—PPS+C1+TBA

In an unexpected manner, the addition of a very small quantity of tribenzylamine (TBA) in accordance with the invention makes it possible to obtain a very high increase (proportionally) in the impact strength.

Examples 4R and 5R—PPS with glass fibres

Although it is normal for the presence of glass fibres to improve the resilience of the PPS (Ex. 4R), it is observed that the incorporation of compound C1 (Ex. 5R) results, in a surprising manner, in a reduction in the impact strength of the compositions.

Examples 6 and 7—PPS+GF+C1+TBA

In Example 6, which relates to a PPS reinforced with glass fibres and comprising a compound C1, it is observed that the addition of a crosslinking catalyst C2 in accordance with the invention (TBA) makes it possible to obtain a correct impact strength, although less than that obtained in the absence of glass fibres (Ex. 3).

It should be specified that, in this Example 6, the GFs were added via the second force-feeder (ZSB2), that is to say after the other ingredients (PPS, C1, TBA) introduced via the main hopper (MH).

In Example 7, the points of introduction of the various ingredients were revised (the compounds C1 and TBA being incorporated via the second force-feeder (ZSB2), that is to say after the GFs incorporated via the first force-feeder (ZSB1)).

Examples 8 and 9—Thermal ageing

These two examples describe the thermal ageing at 150° C. of a composition comprising the same compound C1 as above (in a proportion of 20% by weight with respect to the total of the polymer materials present) as well as, as compound C2,2,4-bis(n-octylthio)-6-(4'-hydroxy-3',5' -di-tert-butylanilino)-1,3,5-triazine (product Irganox® 565) in a proportion of 0.5% by weight with respect to the total of the polymer materials present. The results obtained are reproduced in Table II below: Example 8 relates to the measurements carried out before thermal ageing and Example 9 relates to those carried out after a residence of 500 hours at 150° C. The methods of measurement used are the same as in the preceding examples. It is advantageous to compare them with that which relates to PPS alone (Ex. 1R). The excellent stability with time of the impact strength of this composition is observed.

TABLE II

|  | Example 8 | Example 9 (after 500 hours at 150° C.) |
|---|---|---|
| Notched Izod (J/m) | 130.5 | 116 |
| IFW (J) | 11.5 | 11.8 |

What is claimed is:

1. A composition comprising, by weight, 60 to 99.5 parts of polyphenylene sulphide and 0.5 to 40 parts of a combination comprising at least one compound selected from the group consisting of olefinic elastomer i.e. copolymers derived from at least one olefin and at least one vinylic comonomers, said copolymer comprising at least 50% by weight of said at least one olefin comprising at least one epoxide group, and at least one ethylenically unsaturated radical and additionally comprising at least one tertiary amine which is liquid at temperatures of approximately 280° to 350° C. (at atmospheric pressure) and which is present in an amount from 0.1 to 10% by weight with respect to the weight of said olefinic elastomeric copolymer.

2. The composition according to claim 1, in which the vinylic comonomer is a glycidyl ester of α,β-unsaturated carboxylic acid.

3. The composition according to claim 1, in which the olefinic elastomer additionally derives from at least one other unsaturated comonomer which is copolymerizable with olefins.

4. The composition according to claim 3, in which the unsaturated comonomer is an alkyl ester of an α,β-unsaturated carboxylic acid.

5. The composition according to claim 1, in which the tertiary amine contains at least one $CH_2$ group bonded directly to one of its nitrogen atoms performing the tertiary amine function.

6. The composition according to claim 5, in which the tertiary amine contains at least one aromatic group separated from one of its nitrogen atoms performing the tertiary amine function by at least one $CH_2$ group.

7. The composition according to claim 6, in which the tertiary amine is tribenzylamine.

8. The composition according to claim 1, in which the tertiary amine is an azine.

9. The composition according to claim 8, in which the azine is 2,4-bis(n-octylthio)-6-(4'-hydroxy-3',5'-ditert-butylanilino)-1,3,5-triazine.

TABLE I

| Examples | 1R | 2R | 3 | 4R | 5R | 6 | 7 |
|---|---|---|---|---|---|---|---|
| C1 : Lotader ® AX 8660 | no | 20% | 20% | no | 20% (MH) | 20% (MH) | 20% (ZSB2) |
| C2 : TBA | no | no | 0.2% | no | no | 0.7% (MH) | 0.7% (ZSB2) |
| GF | | no | | | | 40% | |
| Comments | | all → MH | | | GF → ZSB2 | | GF → ZSB1 |
| IFW (2 mm) (J/mm) | 0.1 | 5.1 | 1.4 | 0.7 | 0.9 | 1.1 | 1.9 |
| Notched IZOD (J/m) | 31.8 | 88.6 | 109 | 78.7 | 60 | 90 | 107 |

MH = Main hopper
ZSB1 = First force-feeder
ZSB2 = Second force-feeder
GF = Glass fibres 10. The composition according to claim 1, additionally comprising reinforcing fibres.

11. A process for the preparation of a compound according to claim 1, comprising:

mixing from 60 to 99.5 parts of polyphenyl sulphide and at least one compound chosen from olefinic elastomers comprising at least one epoxide group, and simultaneously or subsequently mixing at least one tertiary amine which is liquid of temperatures of approximately 280° C. to 350° C. (at atmospheric pressure).

12. The process as set forth in claim 11, wherein said phenylene sulphide, olefinic elastomer, and tertiary amine are simultaneously mixed.

13. The process according to claim 11, wherein said phenylene sulphide, olefinic elastomer, and tertiary amine are subsequently mixed.

14. The composition according to claim 1, wherein said tertiary amine has a melting temperature less than 250° C.

* * * * *